United States Patent [19]

Hauser

[11] 4,087,085
[45] May 2, 1978

[54] IMPACT DEFLECTION ABSORBER AND STABILIZER

[76] Inventor: Henry K. Hauser, 828 Beryl, San Diego, Calif. 92109

[21] Appl. No.: 716,504

[22] Filed: Aug. 23, 1976

[51] Int. Cl.² .............................................. F16F 1/00
[52] U.S. Cl. .................................. 267/135; 267/9 R; 248/337; 188/67
[58] Field of Search .............. 267/135, 134, 139, 9 R, 267/9 A, 9 B, 96; 248/24, 337, 358 R; 188/83, 67, 1 B, 129; 61/48; 114/219; 213/22

[56] References Cited

U.S. PATENT DOCUMENTS

| 753,141 | 2/1904 | Kerr | 248/337 |
|---|---|---|---|
| 2,383,265 | 8/1945 | Lehrman | 267/135 |
| 2,908,456 | 10/1959 | Gertel | 248/24 |
| 3,253,718 | 5/1966 | Anderson et al. | 267/9 |
| 3,776,330 | 12/1973 | De Jongh et al. | 188/67 |

Primary Examiner—James B. Marbert
Attorney, Agent, or Firm—R. S. Sciascia; G. J. Rubens; H. Fendelman

[57] ABSTRACT

An impact deflection absorber and stabilizer for providing an interface between two items, surfaces, etc. permitting regulated and controlled travel (energy absorption) along its longitudinal axis and constraining motion in all other directions. An energy absorbing spring is positioned within a housing comprised of two cylindrical mating surfaces forming a friction surface therebetween. A collar clamp joins the two cylinders together and adjustably controls the amount of friction between the two surfaces thereby providing control of the energy absorbing capability of the device. The clamp also has the effect of strengthening the device along non-longitudinal axes, such that all axes have a resonant or fundamental frequency higher than that along the longitudinal or primary axis whereby the device will yield longitudinally regardless of what direction the forces are emanating from.

6 Claims, 4 Drawing Figures

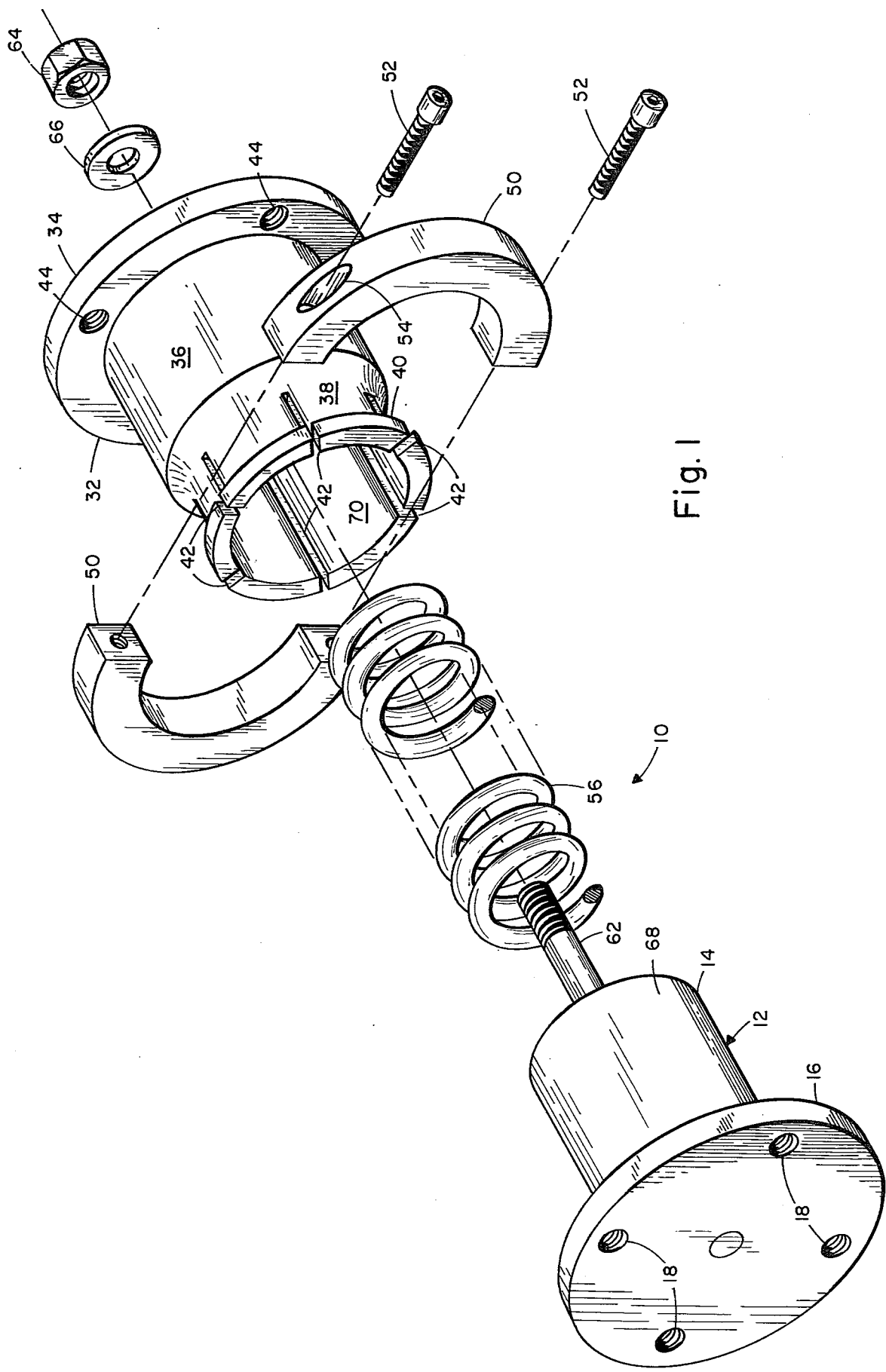

IMPACT DEFLECTION ABSORBER AND STABILIZER

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

The present invention relates generally to the field of shock absorbers and stabilizer mountings. When a Navy ship or submarine experiences shock and vibrations under normal operation, adverse weather conditions, seismic events or battle conditions, relative motion occurs between parts of the equipment being supported and the ship's structure. Since most large items of equipment are usually supported from two or more distinct portions of the ship's structure as, for example, between deck and overhead or between deck and bulkhead, damage occurs causing the installation to break loose either at one or both attachment points.

In the past, slip joints, shear bolt joints, shock mount and vibration isolators have been employed for supporting and securing items of equipment. The item of equipment may be any electronic, mechanical, electrical, hydraulic, etc., object or piece of hardware that requires protection against high impact shock and vibration forces. These joints and connecting devices have been designed to fail at a predetermined low shock level or to attenuate shock acceleration forces, respectively. Each time the shock levels are exceeded, it is necessary to inspect and repair or replace all mounting joints and isolators that have failed. This process is costly both from logistics and manpower standpoints.

Items of equipment have also been secured both to the deck and to a bulkhead by means of rigid top, side or rear support braces of an indeterminate number of configurations. In many cases shock and/or vibration isolators of one type or another are also improperly used, usually in an undesirable cantilevered fashion. The result is a hodge-podge of items of equipment being installed with mounts, support braces, pipes, tubes, bars, bushings, angle irons, etc. These costly and inefficient methods of installation are a result of the necessity of the item of equipment to nearly always be installed near a bulkhead, the necessary excursion space associated with and required by shock and vibration isolators, and a complete lack of standardization in most installations. The problem is further compounded by the fact that all of these crude efforts to support the items of equipment result in only a minor degree of improvement in environmental protection.

SUMMARY OF THE INVENTION

The present invention relates to a solution to the above stabilization and shock absorption problems by providing a simple impact deflection absorber and stabilizer that is adapted for connecting the top of the item of equipment to the ship's overhead structure. The present invention is similarly well adapted for use on automotive or other vehicular equipment for connecting the bumper to the framework, for example. The present invention is also suitable for use on aircraft, helicopters, trains, and any other place where a stabilizer/absorber is required or desirable.

The absorber/stabilizer of the present invention eliminates the conglomeration of inefficient, costly, and non-standard methods used to install an item of equipment. This invention operates on the theory that once energy is created it must be controlled (adequately dissipated) or damage will occur. It is designed to dissipate the energy input in either a vertical or a horizontal orientation regardless of the direction of the source. It is further designed to provide 90° stabilization to the principal orientation axes from all normal and oblique forces by using two cylindrical mating surfaces where friction is developed and regulated by a split hub and two-piece sectional collar. By proper adjustment of the collar clamp, the absorber/stabilizer of the present invention can also be set to permit a small degree of lateral elasticity if desired. Generally, however, the collar clamp of the absorber/stabilizer of the present invention is adjusted such that the lateral stiffness and therefore the lateral resonant frequency is higher than the longitudinal resonant frequency of the device whereby all normal and oblique force inputs are restrained by the absorber/stabilizer and dissipated in the direction of orientation through a combination of a helical compression spring and mating cylindrical friction surfaces. This occurs because the helical spring and frictional contact surfaces provide the least path of resistance to forces regardless of the input direction. Further, by using a cylindrical design for the absorber/stabilizer, the device has equal force restraining characteristics in a 360° circumferential direction perpendicular to its own axis of orientation.

The present invention thus solves current equipment stabilization problems for shipboard and other applications and can be fabricated and adjusted to accommodate various loading conditions and can be designed in any size and load capacity from ounces to tons. The invention has universal application for all commercial ships for stabilizing various sizes and shapes of equipments and for absorbing shock loads. The invention can also be adapted for use on automobile bumpers to absorb high energy collision impacts or any other type of vehicular or conveyance apparatus for the purpose of reducing collision damage and saving lives.

STATEMENT OF THE OBJECTS OF THE INVENTION

Accordingly, it is the primary object of the present invention to provide a novel interface connection between an item of equipment and some other structural member that serves as both an impact deflection absorber and a stabilizer.

It is a further object of the present invention to permit an item of equipment to travel only in one principal axis for the purpose of dissipating energy produced by shock and vibration forces and simultaneously stabilizing the item of equipment against all lateral and oblique forces, regardless of what direction the forces are emanating from and what excitation means is causing the force.

It is another object of the present invention to promote some degree of standardization when installing items of equipment in ships and submarines, thereby effectuating a combination manpower, material, and logistic support cost savings.

It is a still further object of the present invention to obviate the need for bulkhead rear shock and vibration mounts as well as stabilizers of any size and configuration that support items of equipment which are secured both to a vertical plane and horizontal plane (deck, foundation, floor, bed, etc.) on vessels. This applies to rear mounts, stabilizers, etc., regardless of where they are attached to the rear surface of the equipment (top, bottom, center, left, right, etc.).

It is a still further object of the present invention to obviate side shock and vibration mounts, diagonal braces, and all other preventative swaying devices and mechanisms that extend out or connect from the sides of an item of equipment to any horizontal plane (deck platform, bed, floor, ceiling, upper deck, etc.) above or below the equipment.

It is another object of the present invention to obviate the need for shock and vibration mounts, diagonal braces, and all other mechanical support configurations used to secure an item of equipment from its top surface (1) to an overhead horizontal plane or structure, (2) to any vertical plane (bulkhead, wall, frame, etc.) whether it be at the rear, front, or sides of the equipment and, (3) to any horizontal plane underneath the bottom surface of the equipment.

It is a further object of the present invention to disclose a novel impact energy absorber suitable for use between the frame and bumpers of an automobile, truck, train or any other type of vehicular or conveyance apparatus for the purpose of reducing collision damage and saving lives.

It is a further object of the present invention to disclose a novel impact energy absorber suitable for use on all types of aircraft including airplanes, helicopters, space ships, dirigibles, etc.

It is a yet further object of the present invention to disclose a novel impact energy absorber and stabilizer suitable for protecting any type of equipment or object against the forces, accelerations, and disturbances of earthquakes, explosions, missile firings, etc., and any other shock and vibration impact forces regardless of the source.

These and other objects of the present invention will become apparent when considered in conjunction with the accompanying drawings.

BRIEF DESCRIPTION OF THE DRAWINGS

FIG. 1 is an exploded isometric assembly of the present invention.

DESCRIPTION OF THE PREFERRED EMBODIMENT

Figure 2:
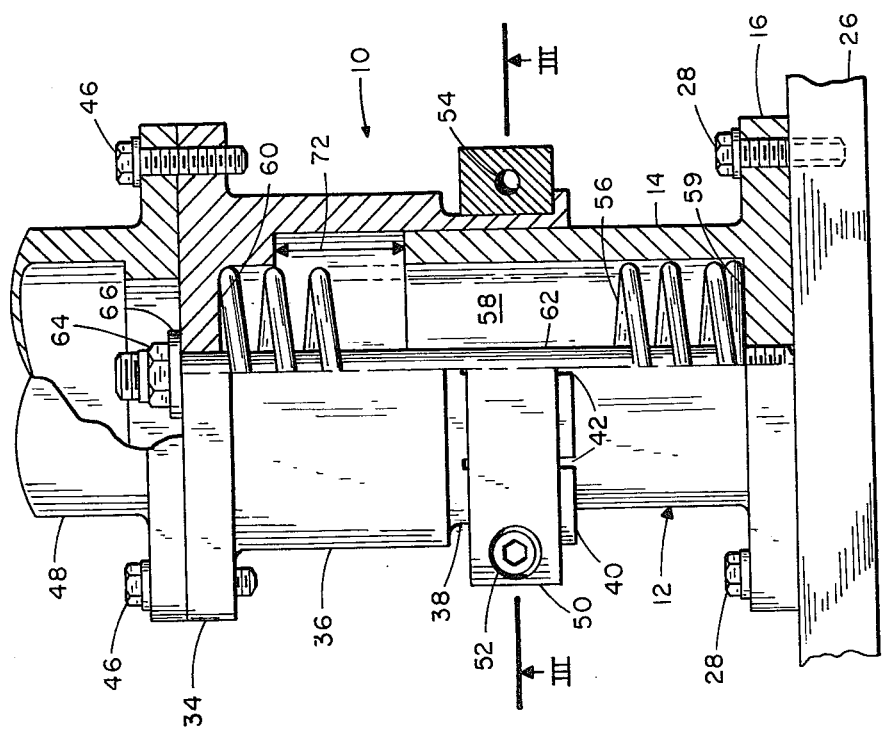
FIG. 2 is a half-sectioned assembly installation of the present invention.

Referring now to FIGS. 1 and 2 the absorber/stabilizer 10 of the present invention will be described. The absorber/stabilizer 10 comprises a base support member 12 including hollow cylindrical base portion 14 and mounting flange 16 preferably formed integrally. Mounting holes 18 are provided in the flange member 16 for securing the absorber/stabilizer 10 to an item of equipment 26 or similarly to the frame of an automobile or other structure. The holes 18 may be threaded and fitted with securing bolts 28 two of which are illustrated in FIG. 2. The cap support member 32 likewise comprises a top mounting flange 34 and a hollow cylindrical portion 36 preferably formed integrally. Although portions 14 and 36 are described and illustrated as cylindrical it is to be understood that any other tubular design could be used including square or rectangular tubes, elliptical tubes, etc. The cap support 32 also includes integrally therewith a hub member 38 formed as by turning the cap support 32 to form the recess. Retaining ring 40 is provided at the end of hub 38. Both the hub 38 and retaining ring 40 are provided with slots 42 as illustrated. The cap support top mounting flange 34 is provided with holes 44 which may be threaded to receive threaded bolts 46 for securing the absorber/stabilizer 10 to an interface connecting tube 48 which would connect at its other end to the upper ship deck or for securing the absorber/stabilizer 10 to an automobile bumper (not shown) or the like. A split shaft coupler comprised of identical members 50 fits within the recess in the hub member 38 to provide a generally annular collar clamp. The split shaft coupler may be secured and tightened by socket headed cap screws 52 which connect the two halves of 50 through the counterbored, recessed screw seats 54 provided therein. Helical compression spring 56 is positioned within the cavity 58 formed when the slotted hub 38 and retaining ring 42 portions of the cap support 32 are fitted over the cylindrical portion 14 of the base support 12. The distal ends of the helical compression spring 56 abut against the closed ends 59 and 60 of the base support 12 and cap support 32, respectively. Cylindrical rod 62 threaded at each end such that it may be screwed into flange 16 at one end and secured by lock nut 64 and flat washer 66 at its other end may also be provided for preventing the cap support member 32 from separating from the base support member 12 where desirable or necessary as in the automobile bumper stabilizer/absorber application of the present invention. It is noted that where the absorber/stabilizer 10 of the present invention is used in conjunction with an item of equipment aboard ship, the installation would preferably be such that the item of equipment 26, the absorber/stabilizer 10 and the interface connecting to 48 would be positioned between the ship's upper and lower decks thereby obviating the need for the cylindrical rod 62.

The absorber/stabilizer 10 permits motion in its principal axis of orientation, either in the vertical or horizontal direction. The energy may be absorbed in the side of the base support 12 and cap support 32 (small acceleration forces) or absorbed and transferred through the bottom of the base support 12 and cap support 32 (large acceleration forces) into the helical compression spring 56 and dissipated. The small end of the cap support 32 is divided into six sections by the slots 42. The amount of separation in the slots 42 is controlled by selective adjustment of the two-piece sectional collar clamp 50. It is readily apparent that by proper torquing of the two socket headed cap screws 52, the proper amount of resistant loading (friction) between the two mating cylindrical surfaces 68 and 70 of the hollow cylindrical base portion 14 and slotted hub 38, respectively, is applied. The split shaft coupler or collar clamp 50 thus provides three important functions: (1) minimum torque on the socket headed cap screws 52 holds the absorber/stabilizer 10 assembly together so it can be easily and safely handled during installation; (2) when the socket headed cap screws 52 are properly secured in accordance with the installation procedures, forces acting in the clamping direction, i.e., normal to the stabilizer 10 are controlled and the item of equipment being supported is stabilized in that particular direction. In accordance with the present invention, the cap screws 52 can be adjusted such that the collar clamp 50 coacts with the base support 12 and cap support 32 such that the resonant frequency of the absorber/stabilizer 10 along the longitudinal axis thereof is lower than the resonant frequency thereof along any other axis. In accordance with this aspect of the invention all normal and oblique force inputs are restrained by the absorber/stabilizer and dissipated in the direction of orientation through the combination of the helical compression spring 56 and the mating cylindrical surfaces 68 and 70; (3) proper torquing of the cap screws 52 also perform the function of controlling the energy absorbing capability of the absorber/stabilizer 10 by increasing or decreasing the amount of friction between the mating cylindrical surfaces 68 and 70 as dictated by the particular load requirements.

The retaining ring 40 serves to prevent the collar clamp 50 from slipping off the cap support 32 in the event that a sudden shock or repetitive vibration occurs that exceeds the frictional holding power of the collar clamp 50 causing it to loosen or slip. A convenience flange (not shown) may also be provided to abut against the mounting flange 34 for attachment between the absorber/stabilizer 10 and, for example, the ship's structure. The design of the convenience flange would depend upon the particular use being made of the absorber/stabilizer 10 of the present invention. For example, in the case of the automobile bumper, the convenience flange or an equivalent piece of hardware would be part of the bumper assembly.

Where the absorber/stabilizer 10 of the present invention is used in an automotive application, the safety stud cylindrical rod 62, lock nut 64 and flat washer 66 prevent the absorber/stabilizer 10 from separating during a collision. A bumper supported by two absorber/stabilizers 10 tends to act as a cantilever member. Therefore, energy released by the compression spring 56 when it returns to normal position after a collision, could overcome the frictional forces between the two mating cylindrical surfaces 68 and 70 causing the bumper to fly off. In the case of shipboard or any other application where both ends of the absorber/stabilizer 10 are secured, the device 10 acts as a fixed beam and is unlikely to separate and, therefore, the rod 62 would be unnecessary.

During installation of the invention, base support 12 is secured to the item of equipment which it supports by a plurality of cap screws 28 or bolts and locking hardward. Helical compression spring 56 is placed inside base support 12 and cap support 32 is placed over the spring and base support 12, thus retaining the spring in its proper position. The cap support 32 internal cylindrical surface 70 makes contact with the external cylindrical surface 68 of the base support 12. It is noted that an adequate amount of travel is provided to permit energy produced by the shock force to be absorbed by the compression spring 56 as is indicated by the double headed arrow 72 in FIG. 2.

When using an absorber/stabilizer on an item of equipment that is installed on board ship, only one measurement is required, that being to determine the length of the interface connecting tube 48. The measured length of the tube should be such that the sum of the vertical heights of the item of equipment, the absorber/stabilizer 10 and the connecting tube 48 exceeds the vertical distance between the upper and lower ship's decks by an additional amount to ensure that when the connecting tube 48 is installed, it will preload the compression spring 56 to approximately 15% of the total design load rating for the specific size of deflection/absorber being used. To achieve high reliability and ensure an additional margin of safety, the absorber/stabilizer 10 should be rated at 75% to 80% of the total load of the compression spring 56 at full compressions. The fundamental frequency of the compression spring 56 should be from 20% to 50% greater than the highest expected steady state vibration input. These percentage ratings are exemplary only and depend, of course, on the particular requirements of the specific application.

For automotive application, the base support member 12 would be secured to the automobile frame by a plurality of hex head bolts such as 28 (FIG. 2) or any other suitable means as required to meet the strength criteria for that particular case. The automobile bumper in turn would be secured to the cap support 32 by a plurality of fastening hardware that meets the desired strength requirements. The size, travel, strength and capacity of the absorber/stabilizer 10 used for automotive application would be determined by the impact force resulting from a collision occurring at various speeds. Preloading of the compression spring 56 for this application would be obtained by tightening the lock nut 64 on the safety stud 62 and compressing the spring the proper amount. Additional resistance to the collision forces is offered by properly torquing the cap screws 52 in the collar clamp 50 and controlling the desired amount of friction between the mating surfaces of the cap support 32 and base support 12 as discussed above. Typically, two absorber/stabilizers 10 would be used in mounting a bumper to a car in place of the normal mounting brackets.

Figure 3:
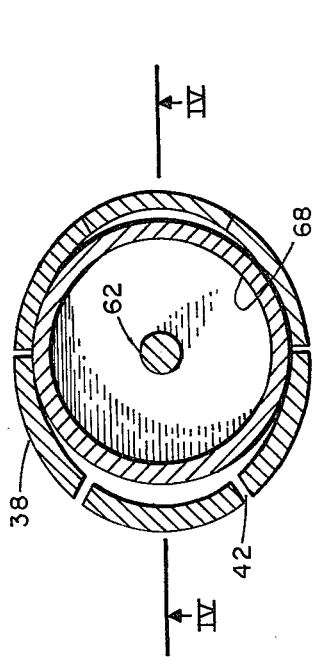
FIG. 3 is an exaggerated pictorial representation demonstrating the effect of a lateral force applied at the base support on the slotted, sectioned hub of the cap support taken along the lines III—III of FIG. 2.
Figure 4:
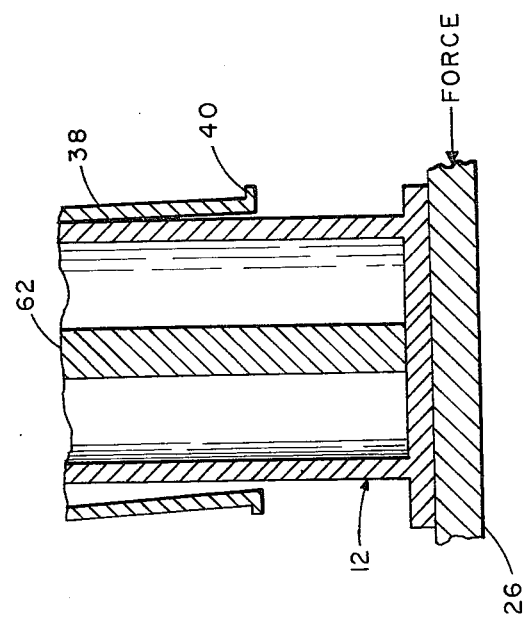
FIG. 4 is a partial cross-sectional exaggerated pictorial diagram illustrating the effect of the same force as that in FIG. 3 and further demonstrating the lateral bending capability of the present invention with proper adjustment of the collar clamp.

Another feature of the present invention is shown in the exaggerated illustrations of FIGS. 3 and 4. By proper adjustment of the collar clamp 50 a slight lateral bending capability can be achieved in the absorber/stabilizer 10. As is illustrated in FIGS. 3 and 4, a lateral force applied to the item of equipment 26 causes a lateral shift in the base support member 12 which in turn applies pressure to the slotted hub member 38, minutely distorting it such that it takes on a slightly elliptical configuration and such that the slots 42 are separated at one end and compressed together at the other end of the resulting elliptical hub 38. It is noted that this type of elasticity is effectuated by proper adjustment of the collar clamp 50, i.e., by leaving it snugly fitted around hub 38, e.g., as by applying approximately 10 inch-ounces of torque to cap screws 52 and, if desirable, can be eliminated altogether also by proper adjustment of the split shaft coupler collar clamp 50. Any suitable materials may be used for the various components of the present invention. For example, the base and cap supports 12 and 32 may be made of aluminum alloy materials anodized for protection against corrosion. The compression spring 56 may be made of zinc coated steel and the collar clamp 50 and cap screws 52 may be made of steel also provided with a corrosion resistant finish. Carbon steel that has been heat treated to the desired strength may be used for the safety stud 62. Lock nut 64 and washer 66 may be made of cad plated steel. It is understood, however, that any other materials may be used for these parts provided they meet the desired design specifications Obviously, many modifications and variations of the present invention are possible in the light of the above teachings. It is therefore to be understood that within the scope of the appended claims the invention may be practiced otherwise than as specifically described.

What is claimed is:

1. An impact deflection absorber and stabilizer comprising:
    a base support including a hollow tubular portion having an open end and a closed end;
    a cap support including a hollow tubular portion having an open end and a closed end;
    said open end of said cap support being disposed over and encompassing at least a portion of said open end of said base support tubular portion such that said cap support and said base support form a generally tubular cavity and such that the inner surface of said cap support and the outer surface of said base support abut to form contacting mating frictional surfaces therebetween;
    a helical compression spring positioned within said cavity; and
    selectively adjustable clamp means in contact with said cap support open end for adjusting the amount of friction between said contacting frictional surfaces.

2. The absorber of claim 1 wherein:
    said cap support tubular portion includes a plurality of slits extending longitudinally along the open end thereof, the amount of separation in said slits being controlled by the adjustment of said clamp means.

3. The absorber of claim 2 wherein said clamp means comprises a generally annular two-piece collar encompassing at least a portion of said cap support tubular portion open end.

4. The absorber of claim 3 wherein said cap support tubular portion includes an annular lip means at the open end thereof for retaining said clamp means in position.

5. The absorber of claim 3 wherein said clamp means coacts with said cap support and said base support such that the resonant frequency of said absorber along the longitudinal axis thereof is lower than the resonant frequency thereof along any other axis.

6. The absorber of claim 3 further including an aperture in said cap support;
    a rod secured at one end thereof to said base support and extending through said cavity and said aperture and adapted for preventing said cap support from separating from said base support.

* * * * *